US012739760B2

(12) United States Patent
Raghavan et al.

(10) Patent No.: US 12,739,760 B2
(45) Date of Patent: Sep. 15, 2026

(54) TRANSMISSION AND RECEPTION VIA ANTENNA MODULE COMBINING

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/513,384

(22) Filed: Nov. 17, 2023

(65) Prior Publication Data

US 2025/0168785 A1 May 22, 2025

(51) Int. Cl.

| | |
|---|---|
| ***H04W 52/42*** | (2009.01) |
| ***H01Q 3/26*** | (2006.01) |
| ***H04B 7/0404*** | (2017.01) |
| ***H04B 7/06*** | (2006.01) |

(52) U.S. Cl.

CPC .......... *H04W 52/42* (2013.01); *H01Q 3/2605* (2013.01); *H04B 7/0404* (2013.01); *H04B 7/0617* (2013.01)

(58) Field of Classification Search

None

See application file for complete search history.

(56) References Cited

U.S. PATENT DOCUMENTS 11,043,997 B2 * 6/2021 Zhao .................... H04B 7/0456
11,108,452 B2 * 8/2021 Bengtsson .......... H04W 72/046
11,570,628 B2 * 1/2023 Shi ......................... H04B 7/088

OTHER PUBLICATIONS

International Search Report and Written Opinion—PCT/US2024/053082—ISA/EPO—Feb. 13, 2025.

* cited by examiner

*Primary Examiner* — Akwasi M Sarpong
*Assistant Examiner* — Gabrielle N Dai
(74) *Attorney, Agent, or Firm* — Arentfox Schiff, LLPs

(57) ABSTRACT

Aspects are directed to an apparatus for wireless communication. In some examples, the apparatus includes one or more memories, individually or in combination, having instructions. In some examples, the apparatus includes one or more processors, individually or in combination, configured to execute the instructions. In some examples, the one or more processors may be configured to obtain an indication of resources. In some examples, the one or more processors may be configured to output an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

17 Claims, 11 Drawing Sheets

104

102/180

Combining Capability 702

Reference Signal(s) 704

706
Identify an adaptive beam weight after measuring at least one reference signal 708
Estimate a maximum transmission power of the aggregated signal Request for Assistance 710

Uplink Transmission 712

TRANSMISSION AND RECEPTION VIA ANTENNA MODULE COMBINING

BACKGROUND

Technical Field

The present disclosure generally relates to communication systems, and more particularly, to combining antenna modules for transmission and/or reception of wireless signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects are directed to an apparatus for wireless communication. In some examples, the apparatus includes one or more memories, individually or in combination, having instructions. In some examples, the apparatus includes one or more processors, individually or in combination, configured to execute the instructions. In some examples, the one or more processors may be configured to obtain an indication of resources. In some examples, the one or more processors may be configured to output an aggregated signal for transmission and/or reception via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

Aspects are directed to an apparatus for wireless communication. In some examples, the apparatus includes one or more memories, individually or in combination, having instructions. In some examples, the apparatus includes one or more processors, individually or in combination, configured to execute the instructions. In some examples, the one or more processors may be configured to obtain an indication of a wireless node's capability to output an aggregated signal for transmission and/or reception via a plurality of antenna modules. In some examples, the one or more processors may be configured to output at least one reference signal after obtaining the indication of the wireless node's capability.

Aspects are directed to a method for wireless communication at a wireless node. In some examples, the method includes obtaining an indication of resources. In some examples, the method includes outputting an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

Aspects are directed to a method for wireless communication at a wireless node. In some examples, the method includes obtaining an indication of another wireless node's capability to output an aggregated signal for transmission via a plurality of antenna modules. In some examples, the method includes outputting at least one reference signal after obtaining the indication of the other wireless node's capability.

Aspects are directed to an apparatus for wireless communication. In some examples, the apparatus includes means for obtaining an indication of resources. In some examples, the apparatus includes means for outputting an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

Aspects are directed to an apparatus for wireless communication. In some examples, the apparatus includes means for obtaining an indication of another wireless node's capability to output an aggregated signal for transmission via a plurality of antenna modules. In some examples, the apparatus includes means for outputting at least one reference signal after obtaining the indication of the other wireless node's capability.

Aspects are directed to a non-transitory computer-readable medium comprising instructions that, when executed by a wireless node, cause the wireless node to perform a method. In some examples, the method includes obtaining an indication of resources. In some examples, the method includes outputting an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

Aspects are directed to a non-transitory computer-readable medium comprising instructions that, when executed by a wireless node, cause the wireless node to perform a method. In some examples, the method includes obtaining an indication of another wireless node's capability to output an aggregated signal for transmission via a plurality of antenna modules. In some examples, the method includes outputting at least one reference signal after obtaining the indication of the other wireless node's capability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
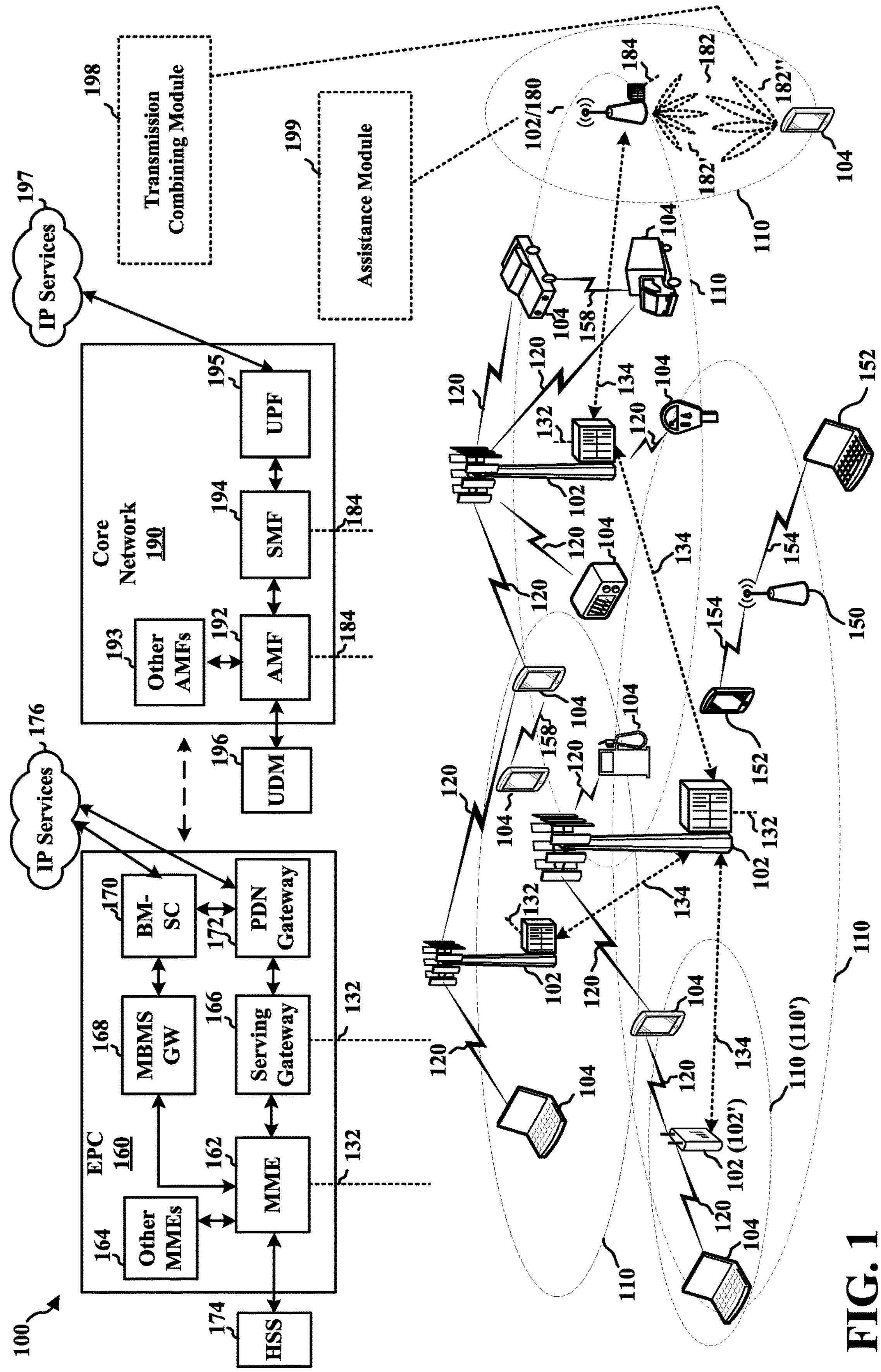
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various configurations of antenna modules are described herein. For example, multiple antenna modules in a user equipment (UE) may be used to provide for spherical coverage or coverage over a sphere around the UE since the directions/angles of arrival in azimuth and zenith around the UE are not expected to have a significant likelihood in any specific region of the sphere. Because each antenna module may include multiple antenna elements, signals may be transmitted via directional beams. To reduce cost and power consumption of a UE, there is an effort to use antenna modules that have relatively small antenna arrays. For example, instead of an antenna module that includes 8 or 16 antenna elements, smaller antenna modules may include 2 antenna elements (e.g., 2×1 dual-polarized antenna array) or 3 antenna elements (e.g., 3×1 dual-polarized antenna array). In some examples, a dual-polarized antenna may include an antenna that can receive and transmit radiofrequency signals with two distinct forms of polarization (e.g., horizontal and/or vertical polarization), simultaneously.

However, small antenna modules may have relatively poor peak gain which may prevent effective wireless communication and may even prevent a UE from being admitted to a cell or network due to poor quality signaling. For example, smaller antenna arrays may prevent a UE from meeting effective isotropic radiated power (EIRP), effective isotropic sensitivity (EIS), and/or other performance requirements for wireless communication in some networks.

Accordingly, aspects of the disclosure are directed to combining post-beamformed signals from multiple antenna modules at the baseband level to increase peak gain and quality of wireless communication.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity of the base station.

Referring again to FIG. 1, the UE 104 may include a transmission combining module 198. As described in more detail elsewhere herein, the transmission combining module 198 may be configured to obtain an indication of resources, and output an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules. Additionally, or alternatively, the transmission combining module 198 may perform one or more other operations described herein.

The base station 102/180 may include an assistance module 199. As described in more detail elsewhere herein, the assistance module 199 may be configured to obtain an indication of a wireless node's capability to output an aggregated signal for transmission via a plurality of antenna modules, and output at least one reference signal after obtaining the indication of the wireless node's capability. Additionally, or alternatively, the assistance module 199 may perform one or more other operations described herein.

Figures 2A, 2B, 2C, 2D:
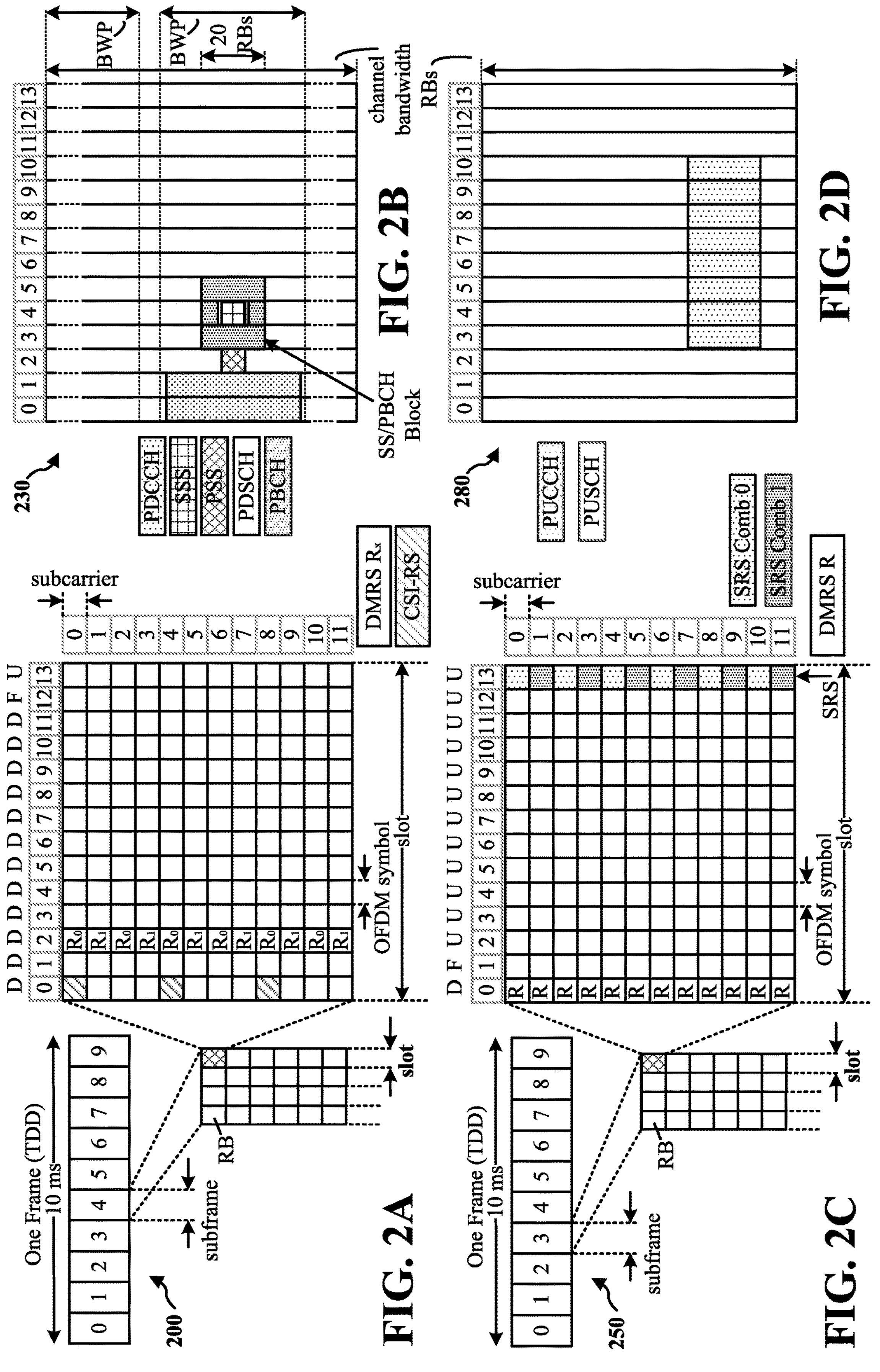
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kilohertz (kHz), where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
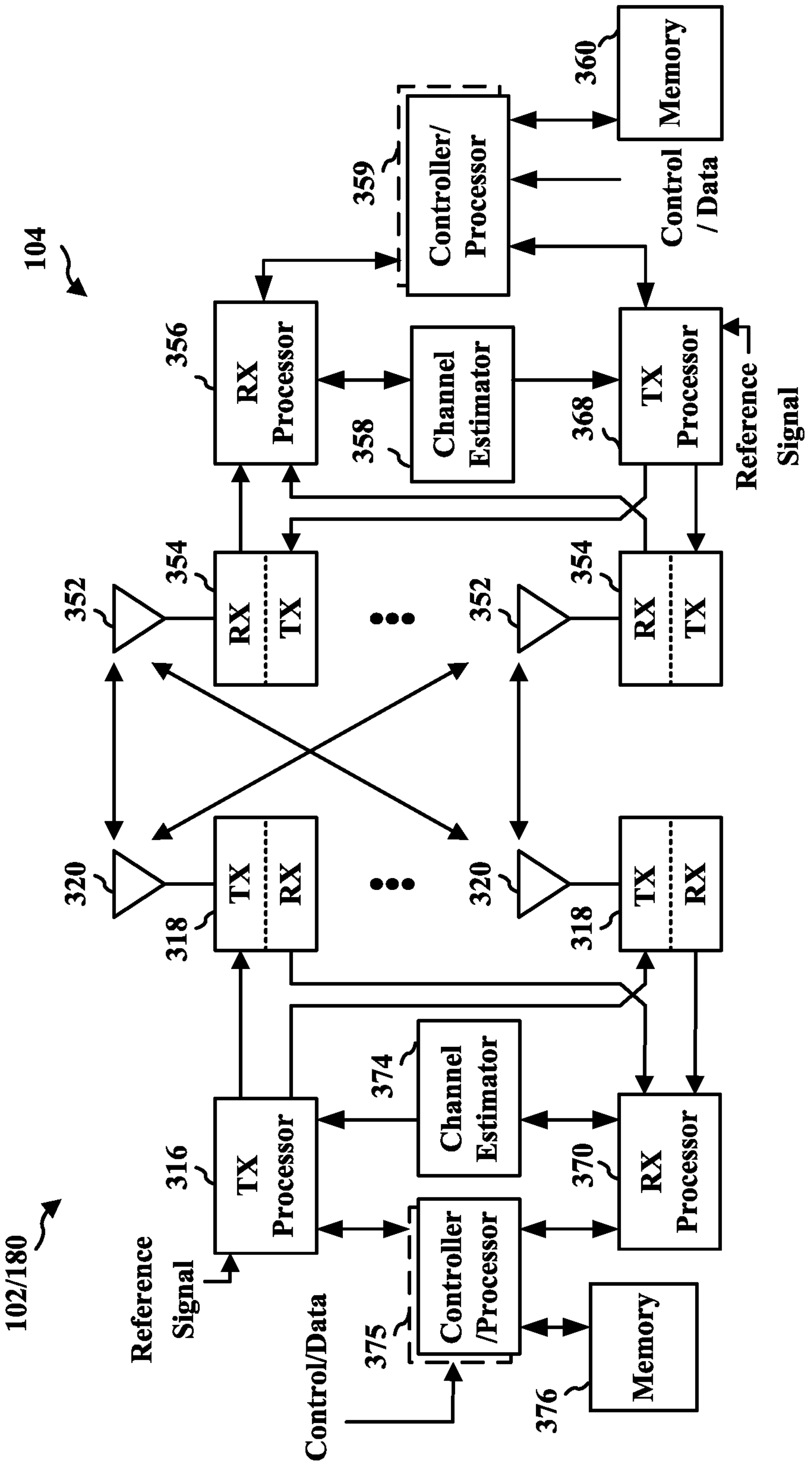
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to one or more controller/processors 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller(s)/processor(s) 359 may be configured to perform aspects in connection with the transmission combining module 198 of FIG. 1.

At least one of the TX processor 316, the RX processor 370, and the controller(s)/processor(s) 375 may be configured to perform aspects in connection with the assistance module 199 of FIG. 1.

Figure 4:
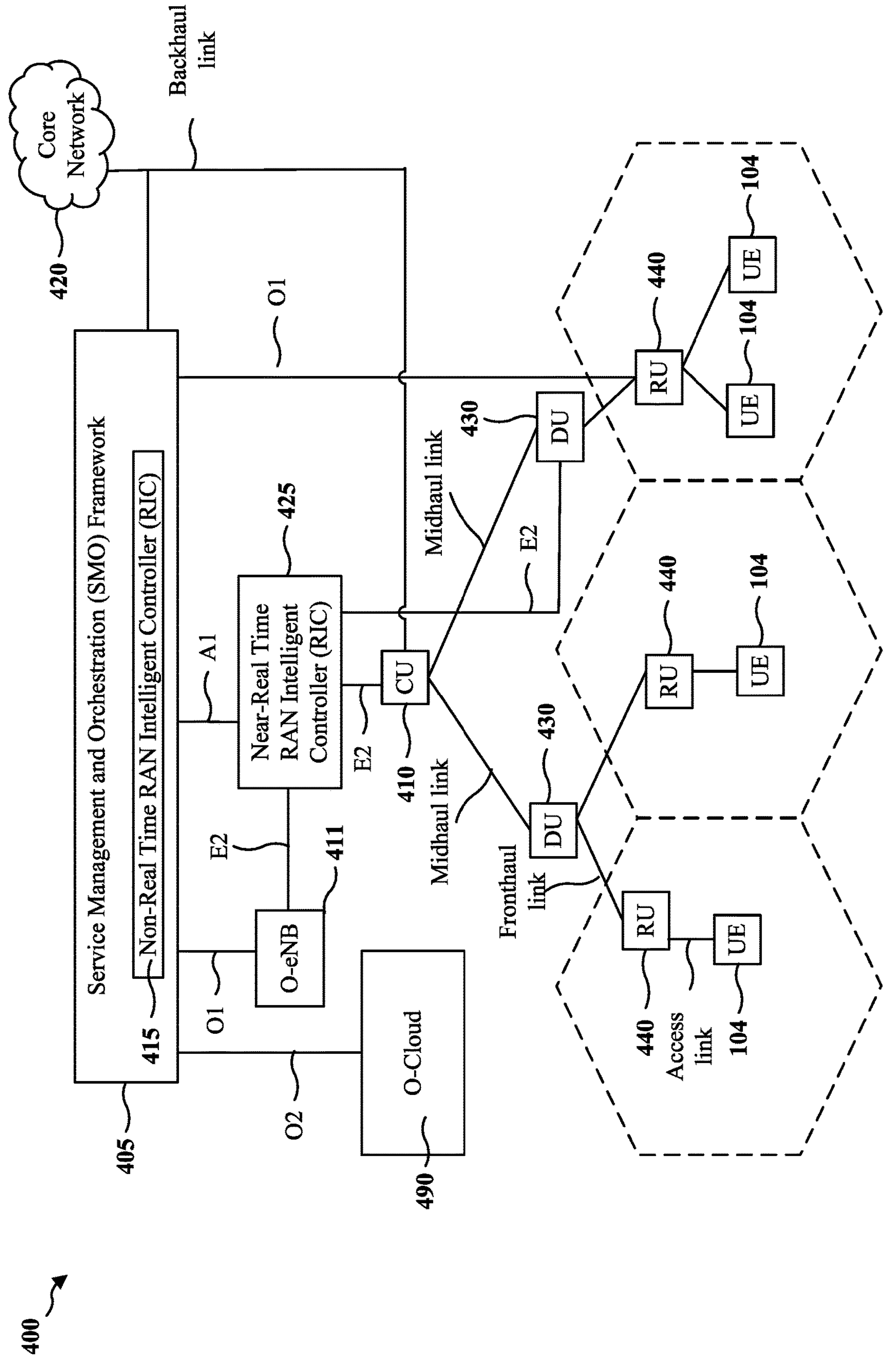
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

Introduction to Antenna Modules

Figure 5:
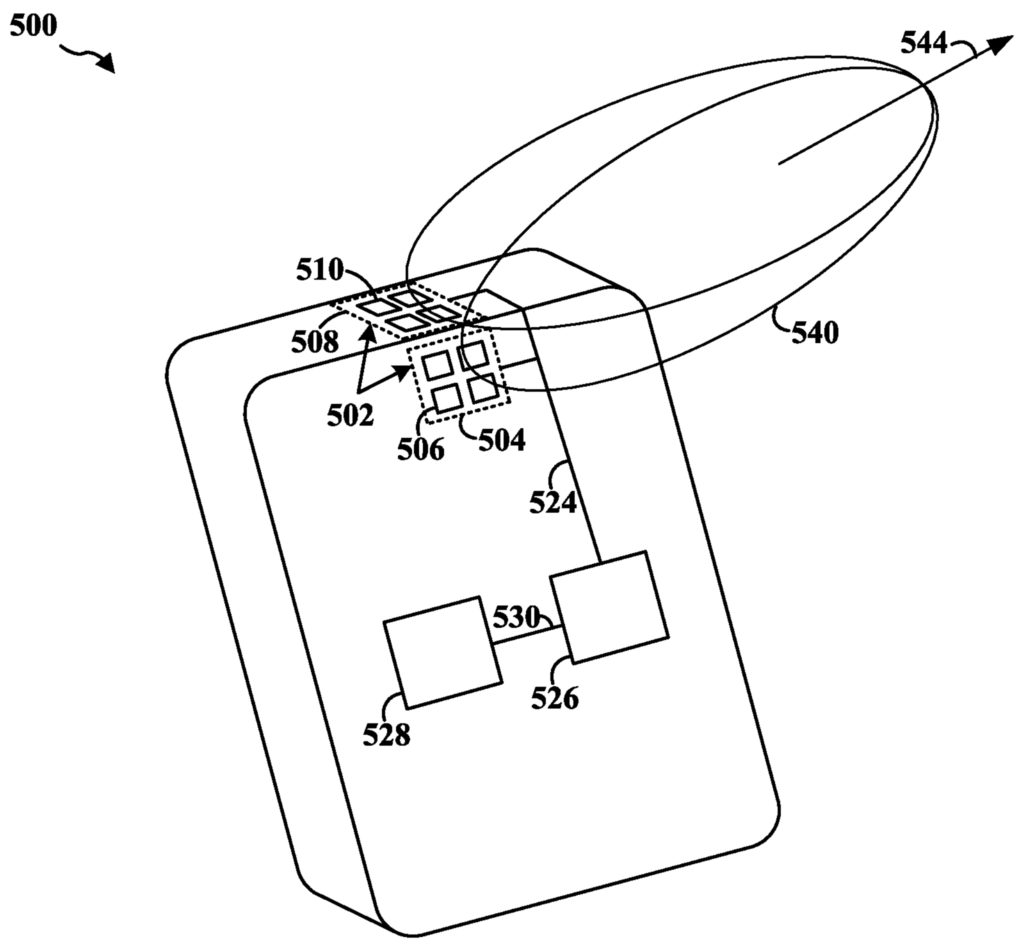
FIG. 5 is a block diagram illustrating a UE with a three-dimensional (3D) antenna system made up of a first antenna module and a second antenna module.

FIG. 5 is a block diagram illustrating a UE 500 (e.g., UE 104 of FIGS. 1 and 3) with a three-dimensional (3D) antenna system 502 made up of a first antenna module 504 and a second antenna module 508. Here, the first antenna module 504 includes a first array of four dual-polarized patch antennas 506 forming a 2×2 array on a first plane corresponding to a first surface of UE 500. The second antenna module 508 includes a second array of four dual-polarized patch antennas 510 forming a 2×2 array on second plane corresponding to the top surface of UE 500 (e.g., an end-fire array). Thus, the first antenna module 504 and the second antenna module 508 are disposed orthogonally on the inside of the UE 500 (e.g., internally located).

The first antenna module 504 may transmit via a beam which points in a direction that is orthogonal or perpendicular to the first plane on which the patch antennas 506 are formed, and the second antenna module 508 may transmit via a beam which points in a direction that is orthogonal or perpendicular to the second plane on which patch antennas 510 are formed. In an example, the first antenna module 504 and the second antenna module 508 may point in a direction that is within a certain angle of orthogonal/perpendicular, for example up to 60 degrees in any direction from orthogonal/perpendicular. While the first antenna module 504 and the second antenna module 508 are each illustrated as a 2×2 array in FIG. 5, one or both may include a greater or fewer number of antennas, and/or the antennas may be disposed in a different configuration. For example, one or both of the antenna arrays may be configured as a 1×4, 1×5, or any other suitable array dimensions.

Each antenna module may be communicatively coupled to an intermediate frequency integrated circuit (IFIC) 526 via an intermediate frequency (IF) path 524. The IFIC 526 may convey IF signals and/or mmW signals over the IF path 124. IFIC 526 may include mixer circuitry (e.g., upconversion and downconversion circuitry) that converts the IF signals received over IF path 524 into baseband signals at a baseband frequency for transmission to baseband processor 528 over baseband path 530. Similarly, the mixer circuitry in IFIC 526 may convert baseband signals received over baseband path 530 into IF signals for transmission over IF path 524. Power and control signals may also be conveyed over IF path 524.

Figure 6:
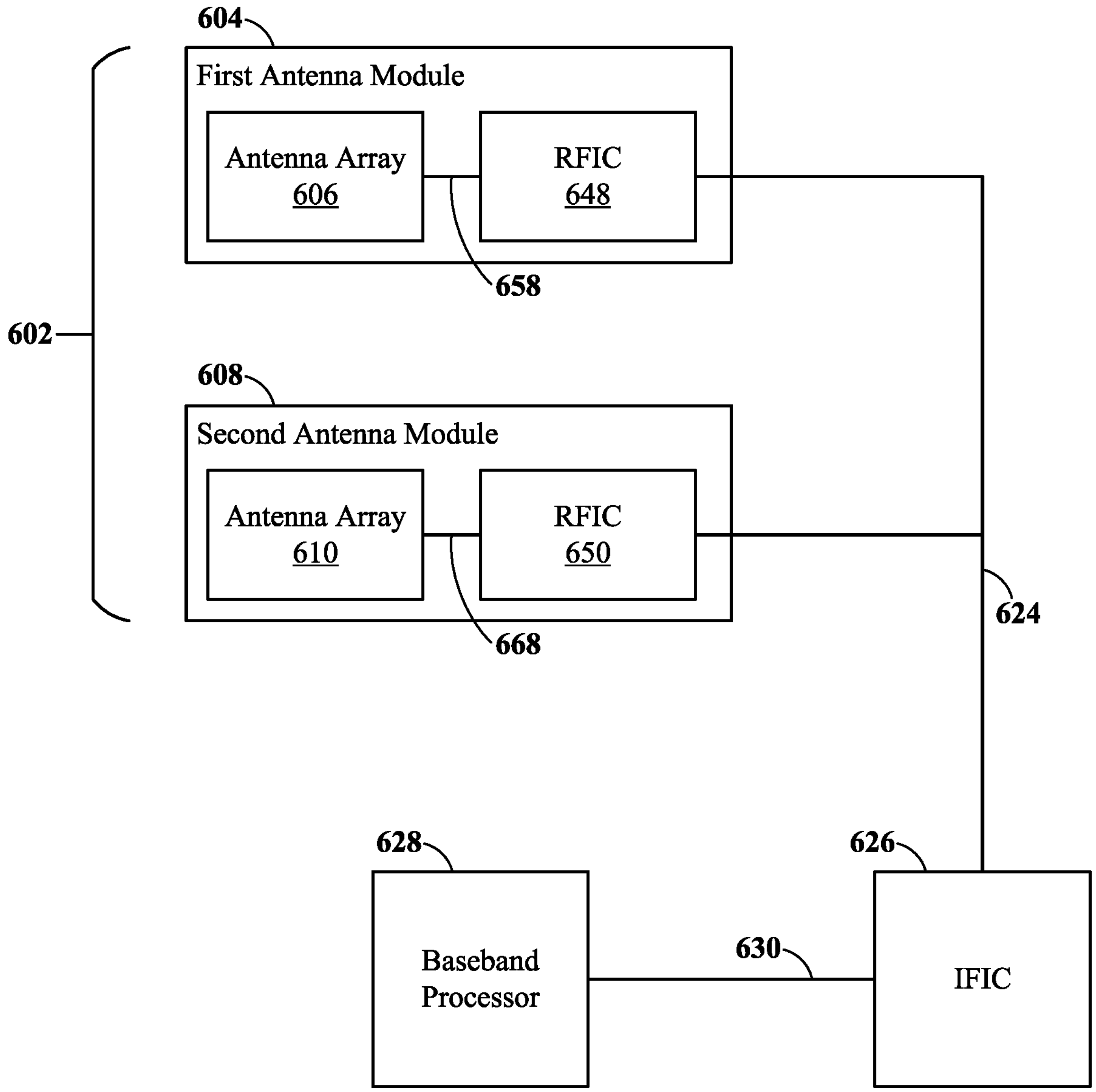
FIG. 6 is a block diagram illustrating an antenna system made up of a first antenna module and a second antenna module.

FIG. 6 is a block diagram illustrating an antenna system 602 (e.g., antenna system 502 of FIG. 5) made up of a first antenna module 604 and a second antenna module 608. Here, the first antenna module 604 includes a first antenna array 606 (e.g., patch antennas 506 of FIG. 5) and a first radio-frequency integrated circuit (RFIC) 648. The second antenna module 608 includes a second antenna array 610 (e.g., patch antennas 510 of FIG. 5) and a second RFIC 650. Similar to FIG. 5, each antenna module may be communicatively coupled to an IFIC 626 via an IF path 624. IFIC 626 may communicate with a baseband processor 628 via a baseband path 630. The first RFIC 648 may be coupled to the first antenna array 606 via a first radio-frequency path 658. The second RFIC 650 may be coupled to the second antenna array 610 via a second radio-frequency path 668. The radio-frequency paths may include radio-frequency transmission line paths configured to convey radio-frequency signals.

Each RFIC may include mixer circuitry (e.g., upconversion and downconversion circuitry) that converts the IF signals from IF frequencies into radio-frequency signals at radio-frequencies for transmission via a corresponding antenna array. Similarly, the mixer circuitry in each RFIC 118 may convert the radio-frequency signals at radio-frequencies into IF signals at IF frequencies for transmission to IFIC 626 over IF path 624. RFIC may also include the phase and magnitude controllers for each corresponding antenna array (e.g., the first RFIC 648 may control the first antenna array 606).

For example, each RFIC may determine and identify a desired beam pointing angle for transmitting a signal via a corresponding antenna array, and may form (steer) the beam at that beam pointing angle. Each possible beam pointing angle that can be used by an antenna array during wireless communications may be identified by a beam steering codebook. Such a codebook may be stored at each RFIC, elsewhere on the UE, or may be located (offloaded) on external equipment and conveyed to the UE over a wired or wireless communications link.

Examples of Antenna Module Combining

As discussed, while antenna modules may be used to form a 3D antenna system that provides a UE with spherical coverage, antenna modules with small antenna arrays (e.g., a low number of antenna elements) may operate with poorer peak array gains relative to antenna modules with larger antenna arrays. Accordingly, aspects of the disclosure are directed to IF-level or baseband-level combining of post-beamformed signals transmitted from multiple antenna modules. By combining the transmit power of multiple antenna modules transmitting in a common set of directions, peak array gains may be improved along those directions.

In the context of signal combining for transmission via multiple antenna modules, aspects of the disclosure are directed to baseband-based signal combining and IF-based signal combining as opposed to RF-based signal combining. Thus, it should be noted that in some examples, baseband-based signal combining relates to combining baseband signals in the baseband domain prior to signal modulation. Once the signals are combined, the resulting signal may be modulated to the carrier frequency for transmission. Accordingly, baseband-based signal combining may occur at a baseband processor (e.g., baseband processor 528 of FIG. 5 or baseband processor 628 of FIG. 6) prior to translating the resulting signal from a baseband frequency to a carrier frequency (e.g., FR2-1 band such as at 26 GHZ). The baseband frequency may be a low-frequency relative to the IF domain and the RF domain.

IF-based signal combining relates to combining multiple signals in the IF domain prior to signal modulation. Once the signals are combined, the resulting signal may be modulated to the carrier frequency for transmission. Accordingly, IF-based signal combining may occur at an IFIC (e.g., IFIC 526 of FIG. 5 or IFIC 626 of FIG. 6) prior to translating the resulting signal from an intermediate frequency to the carrier frequency (e.g., FR2 band (26 GHz)).

RF-based signal combining relates to combining multiple signals in the RF domain (e.g., at or close to the carrier frequency) prior to signal modulation. Once the signals are combined, the resulting signal may be modulated to the carrier frequency for transmission. Accordingly, RF-based signal combining may occur at an RFIC (e.g., first RFIC 648 and RFIC 650 of FIG. 6) prior to transmission. Throughout the disclosure the terms "combined" and "aggregated" may be used interchangeably in the context of signal combination (e.g., signal aggregation).

Such combining relates to the process of combining multiple signals from different transmitters or antennas to enhance overall signal strength and coverage. For example, such combining may be used for beamforming, which is the application of multiple radiating elements transmitting the same signal coherently (or in-phase), combined to create a single antenna with a longer, more targeted stream which is formed by reinforcing the waves in a specific direction. In certain aspects, signal combination may be used to transmit a beam from each of multiple antenna modules in a common direction.

Figure 7:
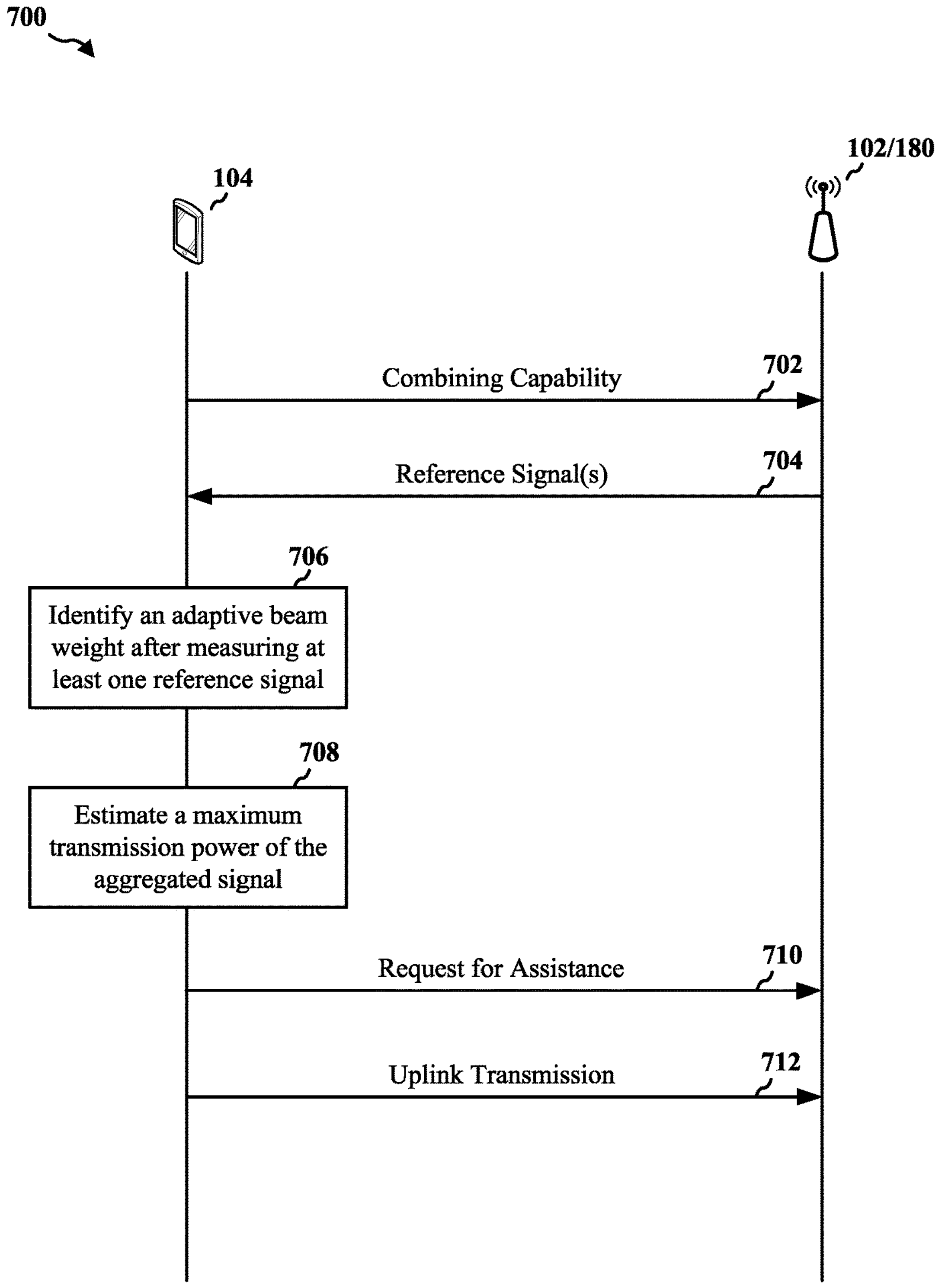
FIG. 7 is a call-flow diagram illustrating example communications between a UE and a base station.

FIG. 7 is a call-flow diagram illustrating example communications 700 between a UE 104 and a base station 102. In a first communication 702, the UE 104 may transmit an indication of its capability for signal aggregation and transmission of an aggregated signal, such as baseband-based signal combining and/or IF-based signal combining. For example, the UE 104 may be equipped with IF connectors/cables configured to couple multiple antenna modules of the UE 104 to the IFIC (e.g., IFIC 526 of FIG. 5, IFIC 626 FIG. 6) and/or connectors/cables configured to couple the multiple antenna modules of the UE 104 to the baseband processor (e.g., baseband processor 528 of FIG. 5, baseband processor 628 of FIG. 6).

In certain aspects, the base station 102 may receive the first communication 702 and provide beam assistance to the UE 104. For example, the antenna elements (e.g., patch antennas) of each of the antenna modules of the UE 104 may face a direction that is different relative to antenna elements of another of the antenna modules, as illustrated in FIG. 5. Thus, the UE 104 may need to determine beam weights for each of the antenna modules in order to ensure that the direction of a first beam radiated from a first antenna module is directed to a target in common with a second beam radiated from a second antenna module. Thus, each of the antenna modules, because they physically face different directions, may use different beam weights in order to radiate their respective beams in a common set of directions.

In order to assist the UE 104 to determine a suitable beam weight for each antenna module, the base station may, in a second communication 704, transmit one or more reference signals to the UE 104 in response to receiving the first communication 702. Accordingly, the UE 104 may receive and measure the one or more reference signals, and in a first process 706, the UE 104 may identify an adaptive beam weight for each antenna module based on the measurement(s) of the one or more reference signals. It should be noted that the UE 104 determines adaptive beam weight(s) corresponding to non-codebook-based beamforming or a dynamic beam codebook. However, in some examples, the UE 104 may measure the one or more reference signals to determine a non-adaptive beam weight using a static beam codebook for each antenna module. Thus, the UE 104 may determine and apply a non-adaptive or adaptive beam weight to each antenna module in order to steer the respective beam of each module in a single common direction or a set of common directions.

Referring back to FIG. 5, the UE 500 may apply a first beam weight to the first antenna module 504 resulting in a first beam direction 540. The UE 500 may also apply a second beam weight to the second antenna module 508 resulting in a second beam direction 542. Here, although the first beam weight may be different from the second beam weight, both beams share a common direction 544. It should be noted that the aggregated signal transmitted by the UE 104 is a combination of a signal transmitted via each the first beam and the second beam. Thus, the aggregated signal may be defined by a higher transmit power relative to a signal transmitted by only one of the antenna modules. As such, the aggregated signal is a combination of a first beamformed signal and a second beamformed signal configured to be output for transmission at a same frequency, and wherein the combination is one of: a baseband combination of the first beamformed signal and the second beamformed signal, or an intermediate frequency (IF) combination of the first beamformed signal and the second beamformed signal.

Referring back to FIG. 7, at a second process 708 the UE 104 may estimate a maximum transmission power of the aggregated signal prior to the aggregated signal being output for transmission via the plurality of antenna modules. For example, the UE 104 may select a first beam weight for the first antenna module and a second beam weight for the second antenna module, where the beam weights are selected based on the base station assistance (e.g., receiving and measuring reference signals transmitted by the base station 102 at the second communication 704 and the first process 706). However, in some examples, the UE 104 may determine the beam weights without base station 102 assistance. Once the beam weights are selected, and before transmitting using the beams, the UE 104 may estimate a maximum transmission power of the combined beams from the combination of antenna modules.

In some examples, the UE 104 may determine whether the estimated maximum transmission power satisfies a threshold condition. The threshold condition may be satisfied if the estimated transmit power is greater than a preconfigured decibel (dB) level. Thus, in one example, if the estimated transmit power using multiple antenna modules is greater than or equal to 5 dB, then the UE 104 may consider the threshold condition satisfied. If the estimated transmit power using multiple antenna modules is less than 5 dB, then the UE 104 may not consider the threshold condition satisfied.

In one example, the UE 104 may determine whether the maximum transmission power satisfies the threshold condition prior to receiving assistance from the base station. Specifically, the UE 104 may select beam weights from a static codebook. If the beam weights allow the direction of each beam to share the common direction (e.g., the common direction 544 of FIG. 5), then the estimated maximum transmission power may satisfy the threshold condition.

However, a static codebook may not include enough of a variety of beam weights to allow for multiple beams from multiple antenna modules to be directed such that the direction of each beam shares the common direction. In this scenario, the UE 104 may determine that threshold condition is not satisfied because the beams may not be adequately combined to generate an aggregated signal with a high enough transmission power. Thus, if the threshold condition is not satisfied, then the UE 104 may determine to use adaptive beam weights instead and may transmit a request to the base station 102 for assistance to determine which adaptive beam weight to apply to each antenna module. Accordingly, the UE 104 may use static codebook beam weights if the aggregated signal with a high enough transmission power (e.g., if the resulting directed beams all share the common direction), but the UE 104 may determine to use adaptive beam weights from a dynamic codebook if the static codebook beam weights result in an aggregated signal estimated to not have a high enough transmission power.

As such, the UE 104 may determine to use each of a first beam direction for a first beamformed signal and a second beam direction for a second beamformed signal, where each of the first beam direction and the second beam direction is a static codebook beam direction so long as the estimated maximum transmission power satisfies the threshold value. Otherwise, if the UE 104 estimates that the maximum transmission power of the combined static codebook beam directions do not satisfy the threshold value, then the UE 104 may determine to use adaptive beam weights instead. In this example, the UE 104 may transmit a third communication 710 to the base station 102 requesting assistance (e.g., the assistance illustrated by the second communication 704).

In some examples, the request for assistance may include an indication that the estimated maximum transmission power does not satisfy the threshold value. Thus, when the base station 102 receives the indication, it may trigger the base station 102 to transmit one or more reference signals to allow the UE 104 to measure and determine adaptive beam weights for each antenna module.

At a fourth communication 712, the UE 104 may transmit an uplink signal to the base station 102, wherein the uplink signal is an aggregated signal transmitted via a plurality of antenna modules.

Figure 8:
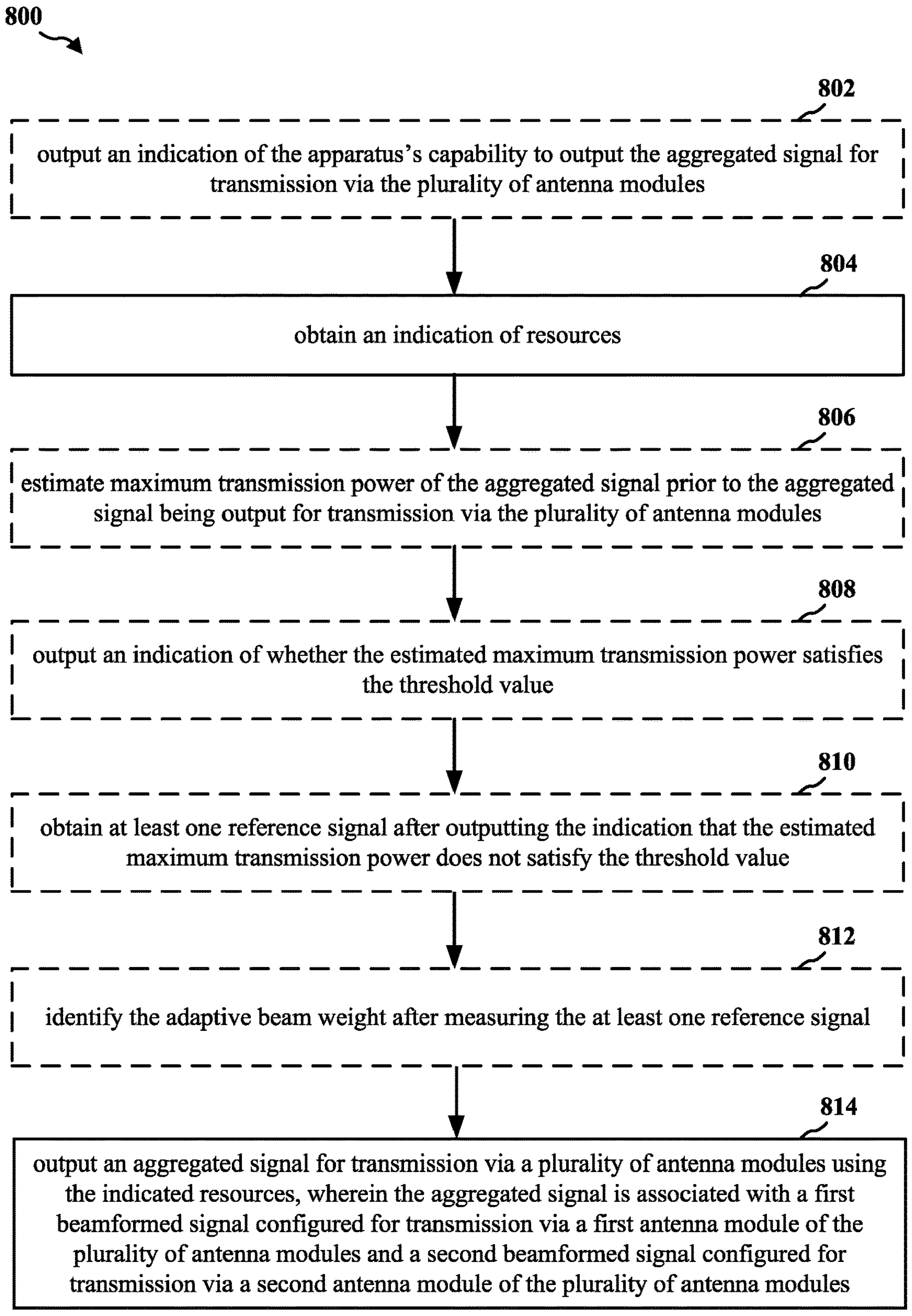
FIG. 8 is a flowchart of a method of wireless communication.

FIG. 8 is a flowchart 800 of a method of wireless communication. The method may be performed by a UE (e.g., the UE 104; the apparatus 902). Specifically, the method may be performed by one or more processors (e.g., the one or more controller(s)/processor(s) 359, the Rx processor 356, the Tx processor 368 in FIG. 3, etc.).

At 802, the UE may optionally output an indication of the UE's capability to output the aggregated signal for transmission via the plurality of antenna modules. For example, 802 may be performed by an outputting component 940. Here, the UE may inform the base station that the UE is capable of transmitting aggregated signaling from multiple antenna modules in order to increase the gain of the transmitted signal. Thus, if the UE is equipped with relatively small antenna modules, the UE may be able to use multiple antenna modules to transmit signaling in a common direction in order to increase the gain of the transmitted signal.

At 804, the UE may obtain an indication of resources. For example, 804 may be performed by an obtaining component 942. Here, the base station may schedule the UE for an uplink transmission and provide the UE with an indication of resources the UE may use to transmit the uplink transmission.

At 806, the UE may optionally estimate maximum transmission power of the aggregated signal prior to the aggregated signal being output for transmission via the plurality of antenna modules. For example, 806 may be performed by an estimating component 944. Here, the UE may determine to transmit the same signal using multiple antenna modules. Thus, the UE may determine an antenna weight for each antenna module in order to direct a beam of each module in a common direction. By directing the beams of the multiple antenna modules in a common direction, the signal transmit strength is increased. However, if one or more of the multiple beams do not align with another beam or point in the common direction, then the signal strength may be reduced. Thus, the UE may first estimate a transmission power of the aggregated signal using determine beam weights prior to transmitting the signal.

At 808, the UE may optionally output an indication of whether the estimated maximum transmission power satisfies the threshold value. For example, 808 may be performed by the outputting component 940. Here the UE may transmit an indication of whether the estimated transmission power satisfies the threshold power. Initially, the UE may select a beam weight for each of the plurality of antenna modules for transmission of the aggregated signal. These beam weights may be non-adaptive beam weights from a static codebook, for example. If the UE indicates that the estimated maximum transmission power does not satisfy the threshold value, then the base station may transmit one or more reference signals to the UE so that the UE may measure the reference signals and reselect one or more non-adaptive beam weights or select one or more adaptive beam weights in order to improve the transmission power. The UE may then repeat the process by estimating the maximum transmission power based on the updated beam weights.

At 810, the UE may optionally obtain at least one reference signal after outputting the indication that the estimated maximum transmission power does not satisfy the threshold value. For example, 810 may be performed by the obtaining component 942. Here, the base station may respond to the indication by transmitting at least one reference signal that the UE may receive and measure to determine and select a beam weight for at least one antenna module. In some examples, the base station may transmit one or more reference signals and the UE may measure the one or more reference signals using multiple antenna modules. The UE may then select an adaptive beam weight or a non-adaptive beam weight for each of the antenna modules based on the measurements.

At 812, the UE may optionally identify the adaptive beam weight after measuring the at least one reference signal. For example, 812 may be performed by an identifying component 946.

Finally, at 814, the UE may output an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules. For example, 814 may be performed by the outputting component 940. Here, the UE may transmit the aggregated signal to the base station. That is, the UE may use multiple antenna modules to transmit the same signal via the same frequency band in order to increase the gain of the transmitted signal.

In certain aspects, the aggregated signal is a combination of the first beamformed signal and the second beamformed signal configured to be output for transmission at a same frequency, and wherein the combination is one of: a baseband combination of the first beamformed signal and the second beamformed signal, or an intermediate frequency (IF) combination of the first beamformed signal and the second beamformed signal.

In certain aspects, the first beamformed signal is defined by a first beam direction, wherein the second beamformed signal is defined by a second beam direction different from the first beam direction, and wherein the aggregated signal is output for transmission via the plurality of antenna modules in a common direction.

In certain aspects, each of a first beam direction of the first beamformed signal and a second beam direction of the second beamformed signal is a static codebook beam direction if the estimated maximum transmission power satisfies a threshold value, and wherein each of the first beam direction and the second beam direction is associated with an adaptive beam weight corresponding to non-codebook-based beamforming if the estimated maximum transmission power does not satisfy the threshold value.

Figure 9:
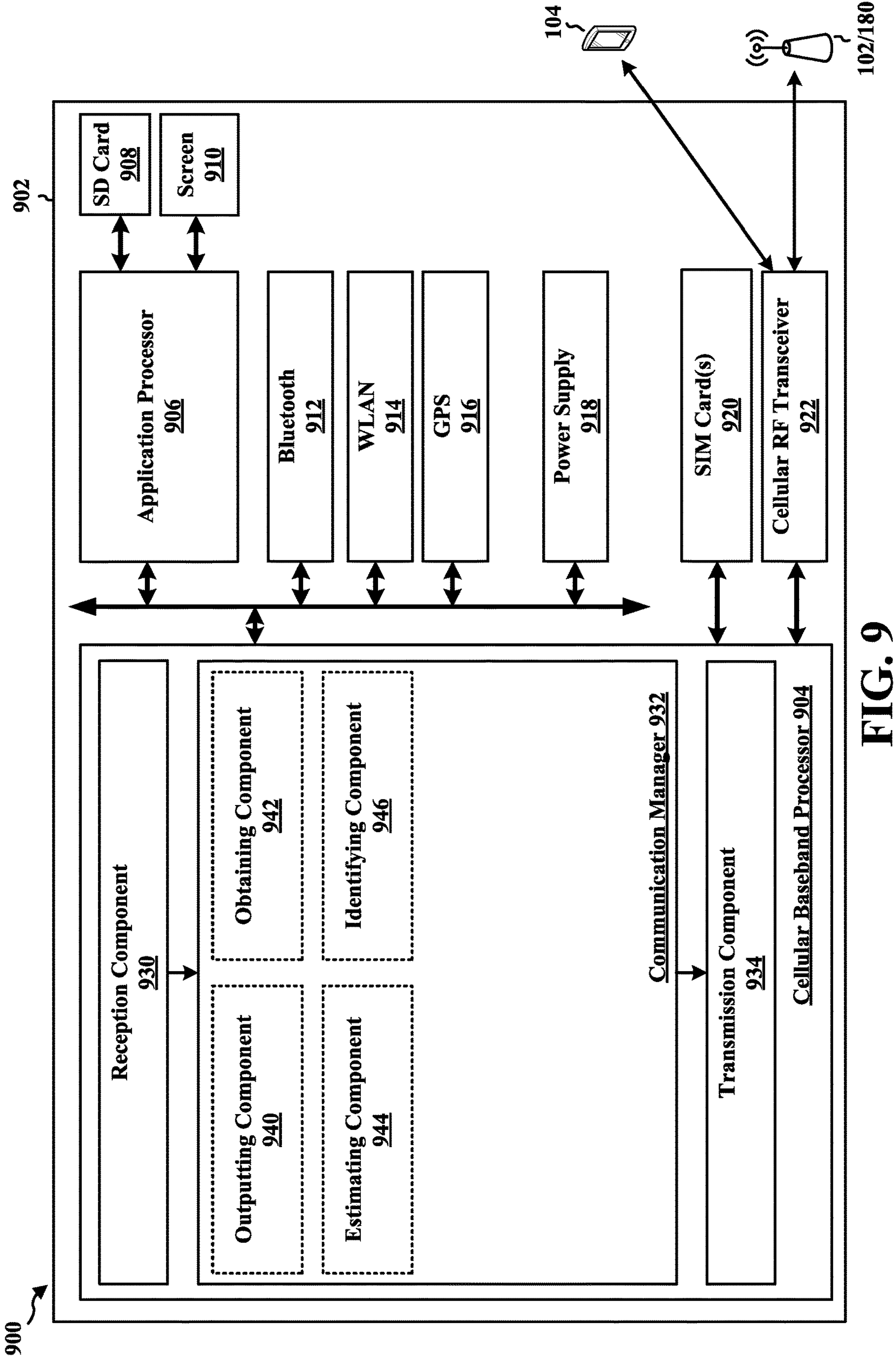
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 104 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see UE 104 of FIG. 3) and include the aforediscussed additional modules of the apparatus 902. In various examples, the apparatus 902 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 932 includes an outputting component 940 configured to output an indication of the apparatus's capability to output the aggregated signal for transmission via the plurality of antenna modules; output an indication of whether the estimated maximum transmission power satisfies the threshold value; and output an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules; e.g., as described in connection with 802, 808, and 814 of FIG. 8.

The communication manager 932 further includes an obtaining component 942 configured to obtain an indication of resources; and obtain at least one reference signal after outputting the indication that the estimated maximum transmission power does not satisfy the threshold value; e.g., as described in connection with 804 and 810 of FIG. 8.

The communication manager 932 further includes an estimating component 944 configured to estimate maximum transmission power of the aggregated signal prior to the aggregated signal being output for transmission via the plurality of antenna modules, e.g., as described in connection with 806 of FIG. 8.

The communication manager 932 further includes a identifying component 946 configured to identify the adaptive beam weight after measuring the at least one reference signal, e.g., as described in connection with 812 of FIG. 8.

The apparatus may include additional components that perform each of the blocks of the algorithm in the aforementioned flowchart of FIG. 8. As such, each block may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for outputting an indication of the apparatus's capability to output the aggregated signal for transmission via the plurality of antenna modules; means for obtaining an indication of resources; means for estimating maximum transmission power of the aggregated signal prior to the aggregated signal being output for transmission via the plurality of antenna modules; means for outputting an indication of whether the estimated maximum transmission power satisfies the threshold value; means for obtaining at least one reference signal after outputting the indication that the estimated maximum transmission power does not satisfy the threshold value; means for identifying the adaptive beam weight after measuring the at least one reference signal; and means for outputting an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Means for receiving or means for obtaining may include a receiver (such as the receive processor 354) and/or an antenna(s) 352 of the UE 104 illustrated in FIG. 3. Means for transmitting or means for outputting may include a transmitter such as the transmit processor 368 or antenna(s) 352 of the UE 104 illustrated in FIG. 3. Means for selecting, means for determining, means for identifying, and means for estimating may include a processing system, which may include one or more processors, such as the controller/processor 359, the memory 360, and/or any other suitable hardware components of the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

Figure 10:
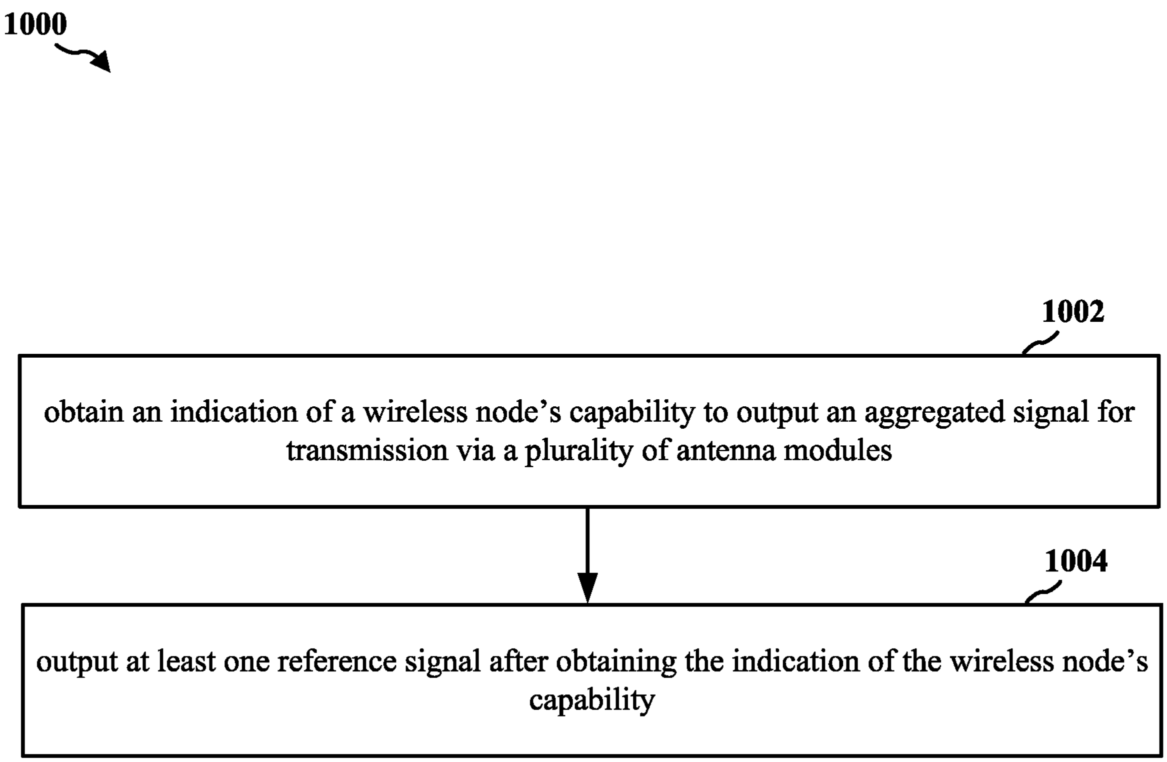
FIG. 10 is a flowchart of a method of wireless communication.

FIG. 10 is a flowchart 1000 of a method of wireless communication. The method may be performed by a base station (e.g., the base station 102/180; the apparatus 1102). Specifically, the method may be performed by one or more processors (e.g., the one or more controller(s)/processor(s) 375, the Rx processor 370, the Tx processor 316 in FIG. 3, etc.).

At 1002, the base station may obtain an indication of a wireless node's capability to output an aggregated signal for transmission via a plurality of antenna modules. For example, 1002 may be performed by an obtaining component 1140. Here, the base station may receive an indication from the UE notifying the base station that it can output an aggregated uplink signal by transmitting the signal via multiple antenna modules in a common direction.

At 1004, the base station may output at least one reference signal after obtaining the indication of the wireless node's capability. For example, 1004 may be performed by an outputting component 1142.

In certain aspects, the indication of the wireless node's capability comprises an indication of whether an estimated maximum transmission power satisfies a threshold value.

In certain aspects, the at least one reference signal is output for transmission if the estimated maximum transmission power satisfies the threshold value.

Figure 11:
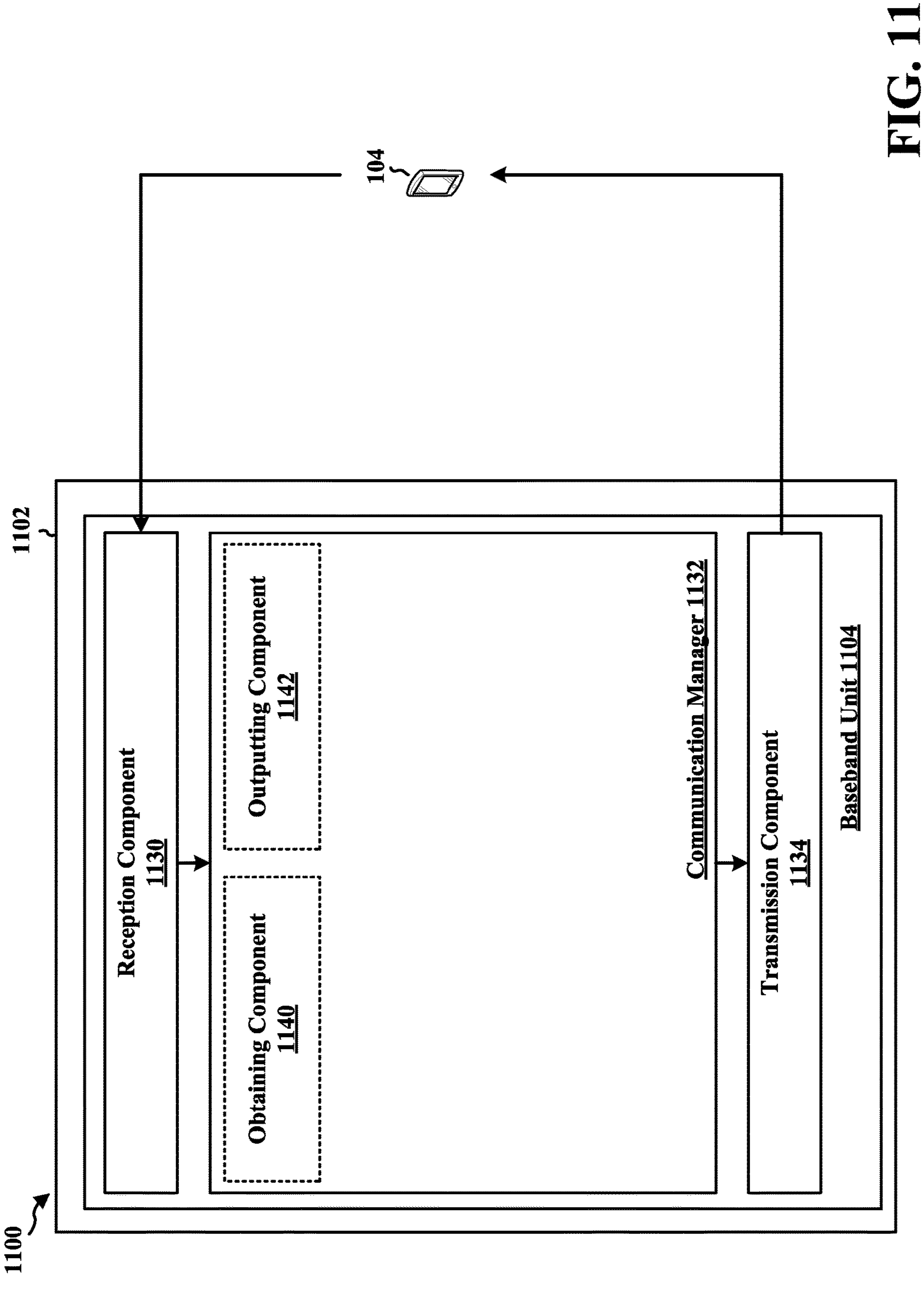
FIG. 11 is a diagram illustrating another example of a hardware implementation for another example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 102/180 and may include the memory 376 and/or at least one of the TX processor 316, the RX processor 370, and the controller/processor 375. In various examples, the apparatus 1102 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

The communication manager 1132 includes an obtaining component 1140 configured to obtain an indication of a wireless node's capability to output an aggregated signal for transmission via a plurality of antenna modules, e.g., as described in connection with 1002 of FIG. 10. The communication manager 1132 further includes an outputting component 1142 configured to output at least one reference signal after obtaining the indication of the wireless node's capability, e.g., as described in connection with 1004 of FIG. 10.

The apparatus may include additional components that perform each of the blocks of the algorithm in the aforementioned flowchart of FIG. 10. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for obtaining an indication of a wireless node's capability to output an aggregated signal for transmission via a plurality of antenna modules; and means for outputting at least one reference signal after obtaining the indication of the wireless node's capability. The aforementioned means may be one or more of the aforementioned components of the apparatus 1102 configured to perform the functions recited by the aforementioned means. As described supra, the apparatus 1102 may include the TX Processor 316, the RX Processor 370, and one or more controller(s)/processor(s) 375. As such, in one configuration, the aforementioned means may be the TX Processor 316, the RX Processor 370, and the controller/processor 375 configured to perform the functions recited by the aforementioned means.

The means for obtaining an indication of a wireless node's capability to output an aggregated signal for transmission via a plurality of antenna modules may include one or more antennas 320 and the RX processor 370. The means for outputting at least one reference signal after obtaining the indication of the wireless node's capability one or more antennas 320 and the TX processor 316.

Additional Considerations

Means for receiving or means for obtaining may include a receiver, such as the receive processor 356/370 and/or an antenna(s) 320/352 of the BS 102/180 and UE 104 illustrated in FIG. 3. Means for transmitting or means for outputting may include a transmitter, such as the transmit processor 316/368 and/or an antenna(s) 320/352 of the BS 102/180 and UE 104 illustrated in FIG. 3. Means for estimating, means for determining, means for measuring, and/or means for identifying may include a processing system, which may include one or more processors, such as the controller/processor 375/359 of the BS 102/180 and the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "identifying" and/or "estimating" (or any variants thereof such as "identify" and "estimate") encompass a wide variety of actions. For example, "identifying" and/or "estimating" may include calculating, computing, processing, deriving, investigating, looking up (e.g., looking up in a table, a database or another data structure), ascertaining and the like.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at a wireless node, comprising: obtaining an indication of resources; and outputting an aggregated signal for transmission via a plurality of antenna modules using the indicated resources, wherein the aggregated signal is associated with a first beamformed signal configured for transmission via a first antenna module of the plurality of antenna modules and a second beamformed signal configured for transmission via a second antenna module of the plurality of antenna modules.

Example 2 is the method of example 1, wherein the aggregated signal is a combination of the first beamformed signal and the second beamformed signal configured to be output for transmission at a same frequency, and wherein the combination is one of: a baseband combination of the first beamformed signal and the second beamformed signal, or an intermediate frequency (IF) combination of the first beamformed signal and the second beamformed signal.

Example 3 is the method of any of examples 1 and 2, wherein the first beamformed signal is defined by a first beam direction, wherein the second beamformed signal is defined by a second beam direction different from the first beam direction, and wherein the aggregated signal is output for transmission via the plurality of antenna modules in a common direction.

Example 4 is the method of any of examples 1-3, further comprising: estimating maximum transmission power of the aggregated signal prior to the aggregated signal being output for transmission via the plurality of antenna modules.

Example 5 is the method of example 4, wherein each of a first beam direction of the first beamformed signal and a second beam direction of the second beamformed signal is a static codebook beam direction if the estimated maximum transmission power satisfies a threshold value, and wherein each of the first beam direction and the second beam direction is associated with an adaptive beam weight corresponding to non-codebook-based beamforming if the estimated maximum transmission power does not satisfy the threshold value.

Example 6 is the method of example 5, further comprising: outputting an indication of whether the estimated maximum transmission power satisfies the threshold value; and obtaining at least one reference signal after outputting the indication that the estimated maximum transmission power does not satisfy the threshold value.

Example 7 is the method of example 6, further comprising: identifying the adaptive beam weight after measuring the at least one reference signal.

Example 8 is the method of any of examples 1-7, further comprising: outputting an indication of the wireless node's capability to output the aggregated signal for transmission via the plurality of antenna modules.

Example 9 is a method for wireless communication at a wireless node, comprising: obtaining an indication of another wireless node's capability to output an aggregated signal for transmission via a plurality of antenna modules; and outputting at least one reference signal after obtaining the indication of the other wireless node's capability.

Example 10 is the method of example 9, wherein the indication of the other wireless node's capability comprises an indication of whether an estimated maximum transmission power satisfies a threshold value.

Example 11 is the method of example 10, wherein the at least one reference signal is output for transmission if the estimated maximum transmission power satisfies the threshold value.

Example 12 is a wireless node, comprising: a transceiver; one or more memories, individually or in combination, having instructions; and one or more processors, individually or in combination, configured to execute the instructions and cause the wireless node to perform a method in accordance with any one of examples 1-8, wherein the transceiver is configured to: receive the indication of resources; and transmit the aggregated signal.

Example 13 is a wireless node, comprising: a transceiver; one or more memories, individually or in combination, having instructions; and one or more processors, individually or in combination, configured to execute the instructions and cause the wireless node to perform a method in accordance with any one of examples 9-11, wherein the transceiver is configured to: receive the indication; and transmit the at least one reference signal.

Example 14 is an apparatus for wireless communications, comprising means for performing a method in accordance with any one of examples 1-8.

Example 15 is an apparatus for wireless communications, comprising means for performing a method in accordance with any one of examples 9-11.

Example 16 is a non-transitory computer-readable medium comprising instructions that, when executed by a wireless node, cause the wireless node to perform a method in accordance with any one of examples 1-8.

Example 17 is a non-transitory computer-readable medium comprising instructions that, when executed by a wireless node, cause the wireless node to perform a method in accordance with any one of examples 9-11.

Example 18 is an apparatus for wireless communications, comprising: one or more memories, individually or in combination, having instructions; and one or more processors, individually or in combination, configured to execute the instructions and cause the apparatus to perform a method in accordance with any one of examples 1-8.

Example 19 is an apparatus for wireless communications, comprising: one or more memories, individually or in combination, having instructions; and one or more processors, individually or in combination, configured to execute the instructions and cause the apparatus to perform a method in accordance with any one of examples 9-11.

Example 20 is a user equipment (UE), comprising: a transceiver; one or more memories, individually or in combination, having instructions; and one or more processors, individually or in combination, configured to execute the instructions and cause the UE to perform a method in accordance with any one of examples 1-8, wherein the transceiver is configured to: receive the indication of resources; and transmit the aggregated signal.

Example 21 is a network entity, comprising: a transceiver; one or more memories, individually or in combination, having instructions; and one or more processors, individually or in combination, configured to execute the instructions and cause the network entity to perform a method in accordance with any one of examples 9-11, wherein the transceiver is configured to: receive the indication; and transmit the at least one reference signal.

What is claimed is:

1. An apparatus for wireless communication, comprising:
a plurality of antenna modules;
at least one transceiver coupled to the plurality of antenna modules;
one or more memories, individually or in combination, having instructions; and
one or more processors, individually or in combination, configured to execute the instructions to cause the apparatus to:
receive, via the at least one transceiver, an indication of resources;
estimate a maximum transmission power associated with an aggregated signal, wherein the aggregated signal is associated with a first beamformed signal configured for transmission via a first antenna module of the plurality of antenna modules and a second beamformed signal configured for transmission via a second antenna module of the plurality of antenna modules; and
transmit, via the at least one transceiver, the aggregated signal via the indicated resources and using beam weights associated with the plurality of antenna modules and using the estimated maximum transmission power.

2. The apparatus of claim 1, wherein the aggregated signal is a combination of the first beamformed signal and the second beamformed signal configured to be transmitted at a same frequency, and wherein the combination is one of: a baseband combination of the first beamformed signal and the second beamformed signal, or an intermediate frequency (IF) combination of the first beamformed signal and the second beamformed signal.

3. The apparatus of claim 1, wherein the first beamformed signal is defined by a first beam direction, wherein the second beamformed signal is defined by a second beam direction different from the first beam direction, and wherein the aggregated signal is also transmitted in a common direction.

4. The apparatus of claim 1, wherein each of a first beam direction of the first beamformed signal and a second beam direction of the second beamformed signal is a static codebook beam direction if the estimated maximum transmission power satisfies a threshold value, and wherein each of the first beam direction and the second beam direction is associated with an adaptive beam weight corresponding to non-codebook-based beamforming if the estimated maximum transmission power does not satisfy the threshold value.

5. The apparatus of claim 4, wherein the one or more processors are further configured to cause the apparatus to:
transmit, via the at least one transceiver, an indication of whether the estimated maximum transmission power satisfies the threshold value; and
receive, via the at least one transceiver, at least one reference signal after transmitting the indication that the estimated maximum transmission power does not satisfy the threshold value.

6. The apparatus of claim 5, wherein the one or more processors are further configured to cause the apparatus to:
measure the at least one reference signal; and
identify the adaptive beam weight after measuring the at least one reference signal.

7. The apparatus of claim 1, wherein the one or more processors are further configured to cause the apparatus to:
transmit, via the at least one transceiver, an indication of a capability of the apparatus to transmit the aggregated signal.

8. The apparatus of claim 1,
wherein the apparatus is configured to operate as a user equipment (UE).

9. An apparatus for wireless communication, comprising:
a plurality of antenna modules;
at least one transceiver coupled to the plurality of antenna modules;
one or more memories, individually or in combination, having instructions; and
one or more processors, individually or in combination, configured to execute the instructions to cause the apparatus to:
receive, via the at least one transceiver, an indication of a capability of a wireless node to transmit an aggregated signal via a plurality of antenna modules of the wireless node, wherein the indication of the capability of the wireless node comprises an indication of whether a maximum transmission power of the aggregated signal satisfies a threshold value; and
transmit, via the at least one transceiver, at least one reference signal after receiving the indication of the capability of the wireless node, the at least one reference signal being transmitted to assist the wireless node to determine updated beam weights to improve the maximum transmission power of the aggregated signal.

10. The apparatus of claim 9, wherein the at least one reference signal is transmitted if the maximum transmission power does not satisfy the threshold value.

11. The apparatus of claim 9,
wherein the apparatus is configured to operate as a network entity.

12. A method for wireless communication by a wireless node, comprising:
receiving an indication of resources;
estimating a maximum transmission power associated with an, wherein the aggregated signal is associated with a first beamformed signal configured for transmission via a first antenna module of a plurality of antenna modules of the wireless node and a second beamformed signal configured for transmission via a second antenna module of the plurality of antenna modules; and
transmitting, via the at least one transceiver, the aggregated signal via the indicated resources and using beam weights associated with the plurality of antenna modules and using the estimated maximum transmission power.

13. The method of claim 12, wherein the aggregated signal is a combination of the first beamformed signal and the second beamformed signal configured to be transmitted at a same frequency, and wherein the combination is one of: a baseband combination of the first beamformed signal and the second beamformed signal, or an intermediate frequency (IF) combination of the first beamformed signal and the second beamformed signal.

14. The method of claim 12, wherein the first beamformed signal is also defined by a first beam direction, wherein the second beamformed signal is defined by a second beam direction different from the first beam direction, and wherein the aggregated signal is also transmitted in a common direction.

15. The method of claim 12, wherein each of a first beam direction of the first beamformed signal and a second beam direction of the second beamformed signal is a static codebook beam direction if the estimated maximum transmission power satisfies a threshold value, and wherein each of the first beam direction and the second beam direction is associated with an adaptive beam weight corresponding to non-codebook-based beamforming if the estimated maximum transmission power does not satisfy the threshold value.

16. The method of claim 15, further comprising:

transmitting, via the at least one transceiver, an indication of whether the estimated maximum transmission power satisfies the threshold value; and receiving, via the at least one transceiver, at least one reference signal after transmitting the indication that the estimated maximum transmission power does not satisfy the threshold value.

17. The method of claim 16, further comprising:

measuring the at least one reference signal; and identifying the adaptive beam weight after measuring the at least one reference signal.

* * * * *